United States Patent [19]
Haytayan

[11] 3,954,176
[45] May 4, 1976

[54] NAIL CARRYING STRUCTURES

[76] Inventor: Harry M. Haytayan, Sunnyside Lane, Lincoln, Mass. 01773

[22] Filed: Aug. 12, 1974

[21] Appl. No.: 496,365

Related U.S. Application Data

[60] Division of Ser. No. 312,665, Dec. 6, 1972, abandoned, which is a continuation-in-part of Ser. No. 68,423, Aug. 31, 1970, Pat. No. 3,711,008.

[52] U.S. Cl. .............................. 206/347; 206/820
[51] Int. Cl.² ...................................... B65D 85/24
[58] Field of Search .............. 85/17; 206/338, 343, 206/345–347; 227/136

[56] References Cited
UNITED STATES PATENTS

| | | | |
|---|---|---|---|
| 1,951,168 | 3/1934 | Roth | 85/17 X |
| 2,385,777 | 10/1945 | Ebert | 206/347 X |
| 3,211,284 | 10/1965 | Anstett | 206/347 X |

FOREIGN PATENTS OR APPLICATIONS

| | | | |
|---|---|---|---|
| 1,957,930 | 6/1971 | Germany | 206/347 |

*Primary Examiner*—William Price
*Assistant Examiner*—Steven E. Lipman
*Attorney, Agent, or Firm*—Schiller & Pandiscio

[57] ABSTRACT

An article of manufacture is provided which enables nails to be fed serial fashion to a nail-driver device. The article of manufacture comprises a strip shaped to provide a series of apertured nail flanges connected to each other by a mechanically weakened linkage, and nails disposed in the apertures of the flanges.

6 Claims, 13 Drawing Figures

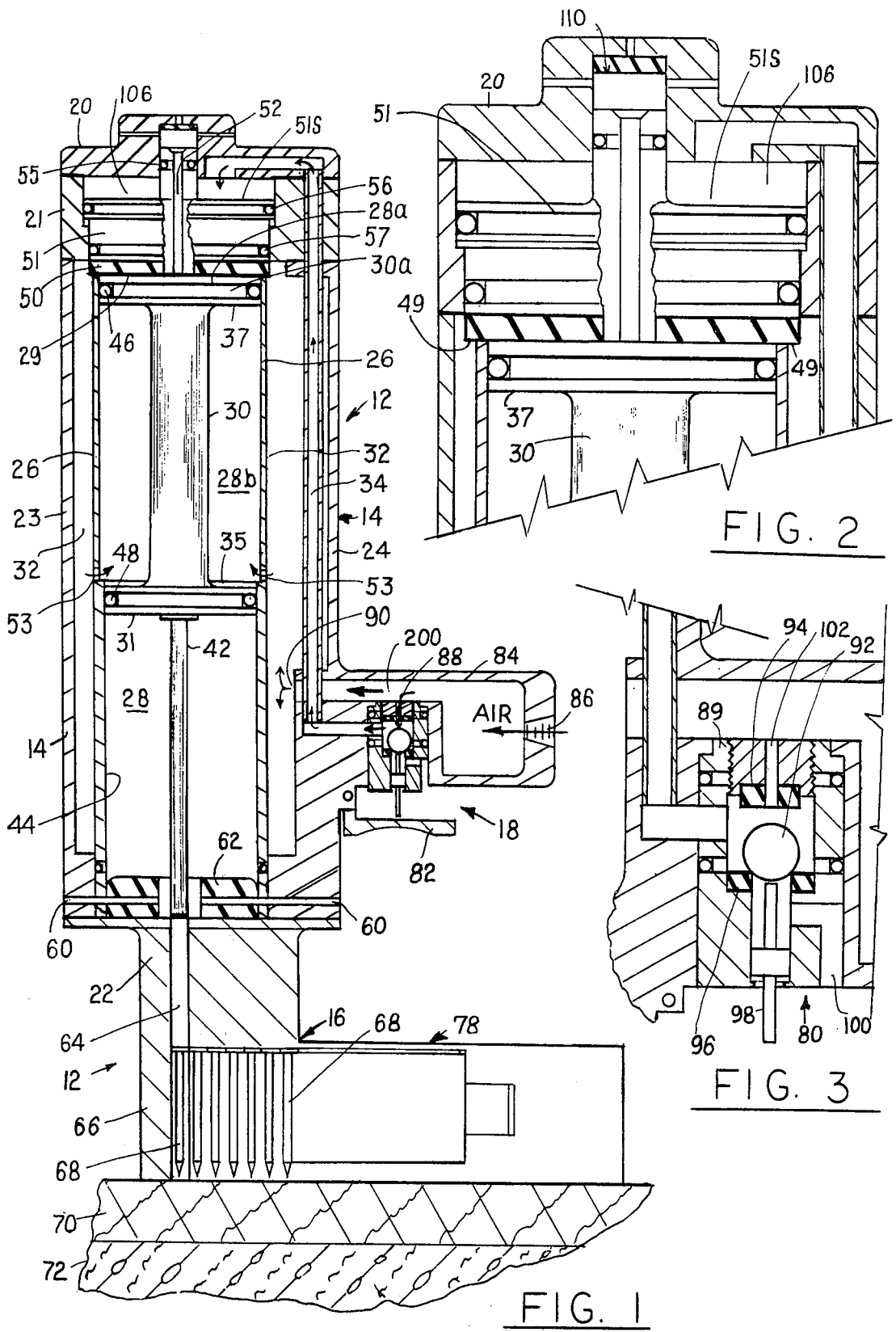

NAIL CARRYING STRUCTURES

RELATED APPLICATION

This application is a division of my copending U.S. Pat. application Ser. No. 312,665 for Improvements in Fastener-Driving Apparatus and Processes, filed Dec. 6, 1972, now abandoned, which is a continuation-in-part of U.S. patent application Ser. No. 68,423 for Impact Tools, filed Aug. 31, 1970 by Clifford and Haytayan. Said U.S. patent application Ser. No. 68,423 issued as U.S. Pat. No. 3,711,008 on Jan. 16, 1973.

BACKGROUND OF THE INVENTION

Pneumatic nail-driving tools are old in the art. They are characterized by loud operation, by substantial recoil, and a limited performance characteristic. Among such devices disclosed in the existing art are those disclosed in U.S. Pat. Nos. 3,498,517 to Novak; 3,060,441 to Henning; 3,035,268 to Goldring; 3,060,440 to Pfaff; 3,595,460 to Pitkin. Another such device is disclosed in U.S. Pat. No. 3,711,008

As a consequence of the limited capability of pneumatic driving devices known to the art most heavy-duty fastener-driving operations are carried out with explosive-actuated devices which are not only time-consuming and expensive to operate, but also which, because of the danger inherent in such devices, require licensed operators. Moreover recoil and noise problems associated with the pneumatic devices are inherent—and usually more pronounced—in the explosive-actuated fastener driving means. The prior art, therefore, has nowhere provided a pneumatic nail driving machine which is useful in heavy-duty, fastener-driving applications, e.g., those applications requiring an input of about 1,250 inch-lbs or more of work to drive the nail into the substrate. And even those pneumatic machines available for relatively light-duty fastening tasks have been excessively noisy, and have had an annoying recoil.

In addition to these problems associated with fastener driving means the art has encountered a further problem relating to the feeding of flanged nails into the driving devices. Flanged-head nail configurations are often required by building code and have heretofore been fed one-by-one into the driving means. These nails generally include a sliding flange which aids in maintaining perpendicularity of the nail which, in addition to being an impact-receiving member, provides a seat for the sliding flange. It is this sliding flange, on being displaced during the nailing stroke, which forms the main portion of the head of a driven nail. Thus, it was desirable to provide improved means for feeding nails to a pneumatic nailing machine.

SUMMARY OF THE INVENTION

It is an object of the invention to provide improved apparatus for driving fasteners, e.g. nails, through wood or even steel strips, into highly resistant structural masses such as those formed of concrete.

Another object of the invention is to provide such an apparatus which is convenient to operate and has relatively low noise and relatively little recoil when compared to prior art devices capable of performing equivalent or similar fastening tasks.

Another object of the invention is to provide a new and highly efficient pneumatic actuating apparatus.

Still another object of the invention is to provide a novel process for driving fasteners by pneumatic actuating means.

Another object of the invention is to provide improved processes for fastening flanged nails with pneumatic nailers.

A further object of the invention is to provide novel process for making a novel fastener assembly particularly well adapted for use in automatic feeding of fasteners into a fastening device.

Another object of the invention is to provide a novel relief valve construction which is particularly useful in the fastening devices of the invention.

Other objects of the invention will be obvious to those skilled in the art on reading the instant application.

The above objects have been accomplished by construction of a pneumatically actuated fastener-driving tool which is characterized by a structure wherein:

1. the driving member or hammer is substantially free of mechanical impedance during an acceleration stroke and is returned to its original position by pneumatic means; for example, it is not required to transfer energy to a spring or other such device on its work stroke;

2. vent means is provided for exhausting air from between the pneumatic piston and the work piece during the impact stroke of the nail head;

3. the hammer is caused to accelerate over a substantial path before it strikes the work with the fastener, i.e. a path at least about as long as the nail height or longer;

4. an air supply sized and valved to substantially increase the acceleration of the hammer throughout a major portion of its downward stroke;

5. a quick-acting, wide-mouthed valve means is utilized to assure rapid supply of motivating air to the piston during the hammer stroke.

In practice, it is desirable to operate the apparatus of the invention so that the energy delivered to the nail head is at least about 30 percent greater than the energy required to achieve the intended fastening action. For example, if the required work is 1,500 inch-lbs, the pneumatic hammer should be of such size and weight that at least about 2,000 inch-lbs of work is deliverable at the nail head. This extra energy has been found of particular value in limiting recoil effects.

Although the inventor does not wish to be bound by the following theory, one established after a comparative study of his apparatus and those known to the prior art, it is his opinion that the particular attributes of his invention relate to the higher initial impact force which the instantly-disclosed apparatus can achieve and to the means by which this impact force is generated. Most prior art devices used in pneumatic driving of nails have been static devices; by static devices is meant devices that provide for little or no acceleration time between the actuation of the hammer part and the impacting of the work by the fastener to be driven by the hammer part.

The inventor avoided this problem, during work initially intended to develop a small-diameter device, by providing a dynamic device wherein his hammer member travels for distance of at least the height of the nail to be driven before impact. However, the approach alone did not solve his problem. In part this appeared to be because spring bias devices used to return the hammer to its starting position provided sufficient energy absorption and mechanical impedance to the forward stroke of the hammer. With the removal of such mechanical impedance devices, it became necessary to provide alternate return means and, in the course of such work, applicant discovered that it was also desirable to provide gas-escape means below the pneumatic piston. Finally, applicant discovered that when the hammer was provided with a relatively obstruction-free air supply system to take full advantage of the acceleration capability made possible by the removal of the spring and the addition of the vent means, he could achieve results not achievable with any pre-existing pneumatic fastener-driving tool. He further discovered that use of a quick-acting, widemouthed valve allowed a high rate of acceleration of the hammer to start immediately.

To provide an improved nail feed means to complement the capabilities of his new driving tool, applicant has constructed a continuous metallic strip formed of flanges into which nails are snugly fitted. The flanges are connected at relatively weak sections of the strip and break off individually when the high initial force is transmitted thereto by the action of the hammer on the nail head. A convenient means for forming this nail-bearing strip is to stamp a strip of metal with a series of spaced holes for receiving nails, and to have the desired shape of a series of flanges. A plurality of strips may be used but one is generally sufficient to provide an adequate serial feed to the apparatus.

ILLUSTRATIVE EMBODIMENT OF THE INVENTION

In this application and accompanying drawings there is shown and described a preferred embodiment of the invention and suggested various alternatives and modifications thereof, but it is to be understood that these are not intended to be exhaustive and that other changes and modifications can be made within the scope of the invention. These suggestions are selected and included for purposes of illustration in order that others skilled in the art will more fully understand the invention and the principles thereof and will be able to modify it in a variety of forms, each as may be best suited in the condition of a particular case.

IN THE DRAWINGS

FIG. 1 is a section, partially diagrammatic, showing a nail driver according to the invention with the hammer in a retracted or ready position.

FIG. 2 is a more detailed section of the quick-opening, wide-mouthed valve structure sealing the top of a pneumatic cylinder seen in FIG. 1.

FIG. 3 is a more detailed view of a check valve useful with the apparatus of the invention.

Figure 4:
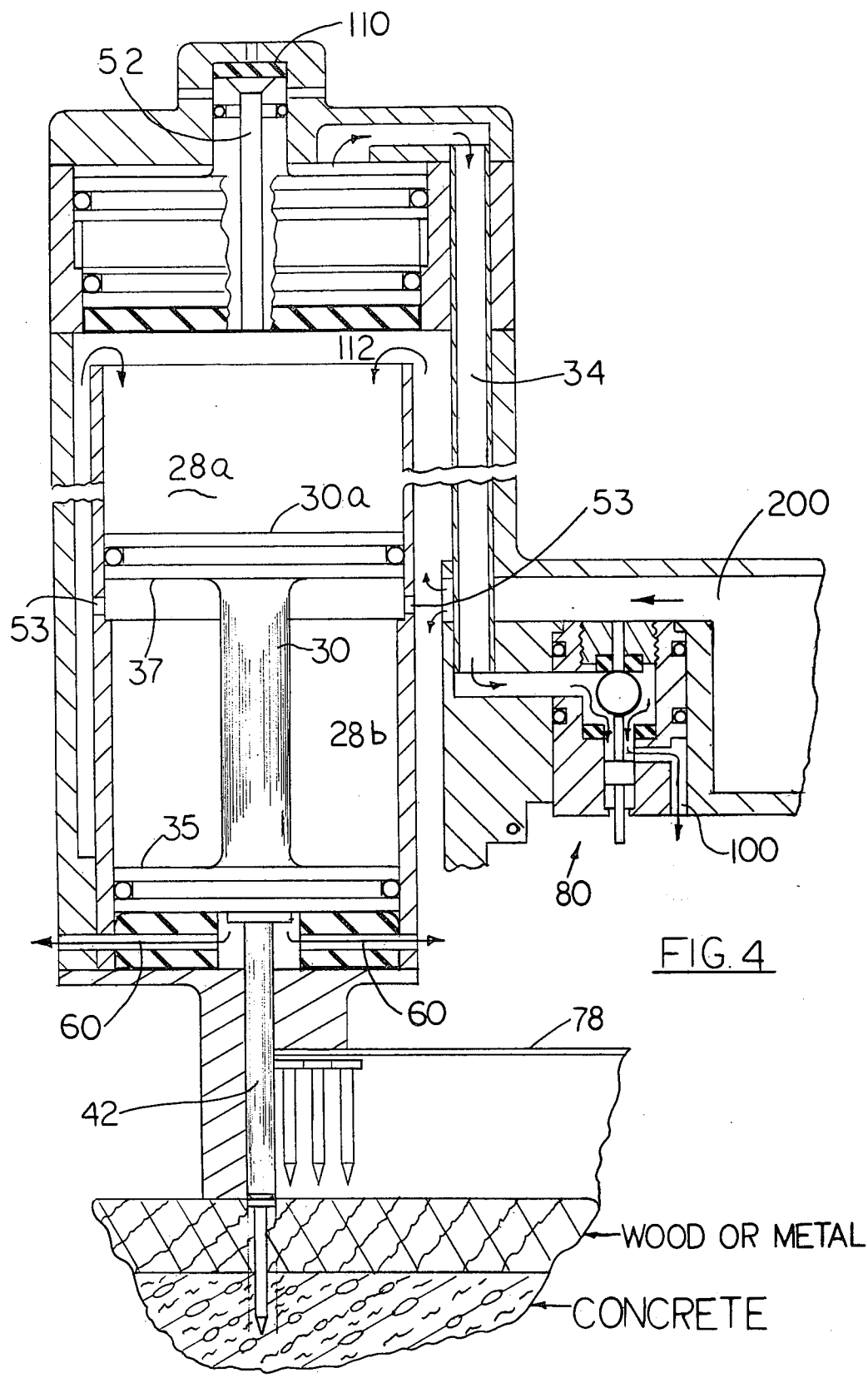
FIG. 4 is a section, partially diagrammatic, showing a nail driver according to the invention with the hammer at the completion of its nail-driving stroke.

Referring to FIG. 1, it is seen that a nail-driving tool 12 comprises a pneumatic cylinder housing portion 14, a nail-receiving and positioning section 16, and a pneumatic control assembly 18.

Housing 14 comprises a cap member 20, at the top thereof, a valve housing 21 mounted just below cap member 20, and a fastener-positioning assembly 22 at the bottom of cylinder 14 in addition to the main housing cylinder tube 24. Tube 24 encloses an interior tube 26. Tube 26 is a cylinder forming a primary pneumatic chamber 28 in which piston means 30 is adapted to reciprocate in response to various pressure differentials to be described below. An annular chamber 32 between tubes 24 and 26 serves as the primary pressurized air supply path connecting the upper portion of chamber 28, i.e. chamber 28a, with pneumatic control section 18 and a pressurized air supply port 86. Chamber 32 has a volume that is about two times, but more advantageously four times, the volume of chamber 28a when the hammer is in the position shown in FIG. 4.

A secondary air path is formed by a conduit 34 mounted in chamber 32 and connecting the pneumatic control section 18 with pneumatic chamber 106 through cap member 20.

Lower piston face 31, when in the retracted position of FIG. 1, is attached to the top of hammer member 42 and is pneumatically sealed to the inner wall 44 of tube 26 by seal means 48 in a manner similar to that in which seal means 46 seals piston face 37 to the inside of chamber 28b. Seated on top of tube 26 is a top valve element 50 forming the bottommost face 29 of air valve 51. Valve 51 comprises a centrally located vent 52 which extends from the bottom face 29 of valve element 50. Valve 51 is positioned and sealed in cap member 20 and valve housing 21 by means of O-ring type seals 55, 56, and 57. It will be noted (see FIG. 2) that valve member 50 comprises an annular portion 49 of face 29 upon which gas in chamber 32 can exert upward pressure. It is this pressure that will thrust the valve open when pressure is released from space 106 between valve 51 and cap 20. It will be further noted that several small air ports 53 spaced around and through tube 26 provide means to admit air from annular chamber 32 into that portion of chamber 28, i.e. chamber 28b, which is sealed between the upper and lower piston faces of piston member 30. In this connection, it will be noted that the lower piston face 35 of chamber 28b is smaller than the upper piston face 37. The resultant force differential tends to keep piston member 30 permanently biased toward a normal upward position.

It will be noted that below piston face 31 and just proximate the bottom of chamber 28, a series of conduits 60 provide means to vent the lower portion of chamber 28 to atmosphere. Conduits 60 are partially formed in a lower cylinder plug member 62.

Fastener positioning assembly 22 comprises a guide path 64 for hammer 42. This path 64 is through a positioning foot 66 which assures the perpendicularity of fasteners 68 with the substrate, here wood 70 and concrete 72, into which the fasteners are to be driven. A plurality of fasteners 68 of preselected height are conveniently fed into the path of hammer 42 from a preassembled cartridge 78.

Pneumatic control assembly 18 comprises a three-way pneumatic valve 80, a valve-actuating trigger 82 pivotally mounted on an adaptor member 83 which is, in turn, mounted on cylinder 14, and an air inlet manifold 84 comprising port 86 leading from an air supply source, port 88 leading to valve 80, port 90 leading to annular chamber 32. As best seen in FIG. 3, housing 87 of valve 80 holds a ball-shaped valving member 92 which can be seated against either seat 94 or seat 96, depending on the position into which operating rod 98 is positioned by trigger 82. When the ball 92 is in sealing contact with seat 94, there is an open air path between conduit 34 and vent 100 to atmosphere. When ball 92 is seated against seat 96, conduit 34 and the main air supply are in contact through valve conduit 102.

Operation of the Nail-Driving Unit

In general, it will be noted that FIGS. 1 through 3 show the apparatus of the invention before it is triggered to drive a nail. FIG. 4 illustrates the apparatus just as the driving stroke is terminated. With the apparatus in the position shown in FIGS. 1 through 3 the operator places the device over the desired location and pulls trigger 82.

It will also be assumed for purposes of this description that, before the trigger is pulled, a compressed air source is connected to port 86 and with the apparatus in the ready position causes a 125-psig pressure in the chamber of gas inlet manifold 84; in annular chamber 32, in conduit 34, in the space 106 between the top face 51s of top air valve 51, and in that chamber 28b which is sealed between piston surfaces 37 and 35, i.e. between seals 46 and 48. Air flows into 28b through holes 53 from annular chamber 32.

There is no pressure on the upper face 30a of piston member 30 because face 30a is directly in contact with the atmosphere through vent 52. In this condition, therefore, the piston member 30 is held upwardly by the aforesaid pressure differential.

When the operator wishes to drive the nail into the wood-and-concrete substrate, he pulls trigger 82 upwardly; this causes ball element 92 to leave seat 96 and to be seated against seat 94.

The following changes, all indicated in FIG. 4, take place immediately:

1. Air rushes down conduit 34 and back to atmosphere through valve 80 and vent 100. This removes any force from holding valve 51 in its downward, or venting, position. Valve 51 raises immediately sealing vents 52 against a vent-valve seat 110.

2. Simultaneously, of course, a generally cylindrical inlet 112 is formed around the periphery of inner tube 26. Air pours through this opening onto the top face 30a of piston 30.

3. Piston 30 immediately starts downwardly. Air pushed downwardly before piston member 30 vents to atmosphere through conduits 60.

4. Piston 30 accelerates hammer 42 through guide path 64 and, consequently, causes the hammer to drive a nail into the wood-concrete substrate as shown in FIG. 4.

When member 92 of valve 80 is reseated into the position of FIGS. 1 through 3, either automatically or by manual action, the flow of air again reverses through conduit 34 and pressure is again brought against surface 51s of valve 51, tending to force it downward to once again open the vent system associated with conduit 52. Air is then expelled upward from chamber 28 through vent 52. Simultaneously air enters holes 53 below piston face 37 and pushes the piston with its attached hammer member upwardly, this occurring because of the aforementioned area differential between surfaces 37 and 35.

It should be emphasized that the peculiar advantages of the invention are related to (1) providing a suitable acceleration time for the hammer before it impacts the fastener; and (2) making certain that the accelerating time is well-utilized. The first item is taken care of by providing a suitable distance between the point at which the hammer is first set in motion and the point that it hits the fastener. However, a number of features are required, or at least highly advantageous in assuring an optimum rate of acceleration during the impact stroke.

The first of these features is the maintenance of a suitable gas supply to the piston. Unless an excellent supply of motive gas is maintained, the piston, after initial acceleration, can tend to be starved and fail to meet its optimum potential. In structural terms, it is desirable that the motive gas be supplied from chamber 32 to the piston through a valve opening which is not too small. This opening should be, at pressure below 200psig, such that the ratio of the area of the operating surface of the piston itself to the valve opening itself is no greater than 8 to 1 (or the pneumatic equivalent thereof) when there are no other serious flow obstructions in the path of the motivating gas. The best practice is to keep this ratio below 4 to 1 when operating at pressures below 130 psi. Of course, even this feature of the invention will not be efficacious if the pressure-gas storage area is unduly limited, and the air supply to the storage volume is unduly constricted.

In the illustrated embodiment of the invention, this feature is illustrated by use of a slot 200. This is about ¾ inch by 5/16 of an inch and are suitable for use with a 2 inch diameter piston and 125 psig when chamber 32 is about 2.3 times the volume of 28a when 28a is expanded as seen in FIG. 4.

A particular feature of the invention is the rapid-opening valve allowing a fast and large supply of compressed air into the piston chamber. This valve opens wide within about 1.7 milliseconds in apparatus wherein the piston itself has a hammer-actuating stroke of 7 milliseconds. This is in the case of a typical five-inch stroke. Thus the advantageous process of the invention is one wherein the valve fully opens within the first 25 percent of the total time required to drive the piston through its hammer-actuating stroke.

As has been mentioned above, it is also desirable to remove such acceleration-impeding devices as return springs, to provide a pneumatic return means, and to provide vent means below the piston. However, at sufficient pressures, those skilled in the art will realize such devices may be tolerated.

Figure 7:
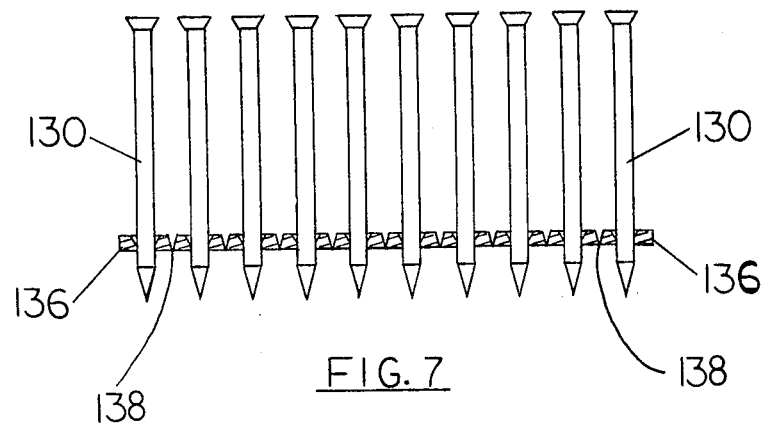
Figure 6:
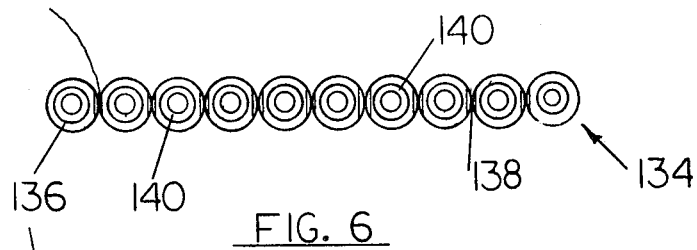
Figure 5:
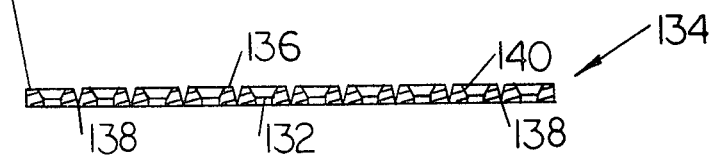

It will be noted that the nail receiving and positioning section 16 is adapted to comprise a cartridge 78 from which nails 68 are fed under hammer stroke path 64. In prior practice, the flanged-head nails of the illustration have not been convenient for use with such apparatus. FIGS. 5 through 7 show a means for connecting the nails 130 by punching apertures 132 in a steel strip 134, punching away the outer periphery of the strip to form a series of circular flanges 136, and forming weakened connector points 138 between the flanges. Nails 130 are conveniently fitted snugly within apertures 132. A recessed bearing surface 140 may be formed into the strip about the uppermost part of aperture 132 to allow the nail to be driven flush with the flange.

It should be understood that when the nails are fed thusly into the fastener device of the invention, the nail will be driven downwardly through the flange and be separated from strip 136 at points 138.

Figure 10:
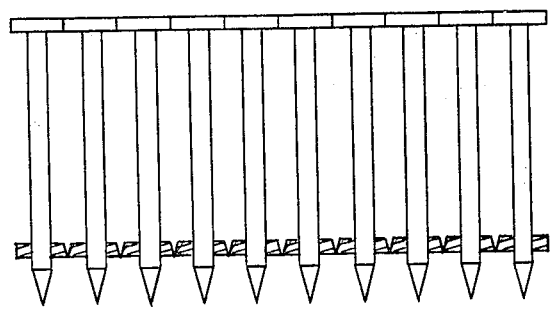
FIGS. 7, 10 and 13 are elevations showing nails properly mounted in the strips of FIGS. 5, 8 and 11, respectively.
Figure 9:
FIGS. 6, 9 and 12 are plan views of the strips shown in FIGS. 5, 8 and 11, respectively.
Figure 8:
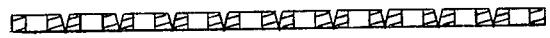
FIGS. 5, 8 and 11 show elevations of various nail-holding strips useful in feeding the apparatus of the invention.

FIGS. 8–10 disclose a nail-carrying structure similar to that shown in FIGS. 5–7 excepting that there is no nailhead-receiving recess in the metal strip and the flanges are already on the nail's striking surface.

Figure 13:
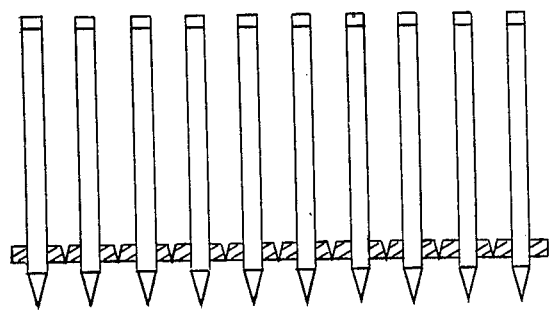
Figure 12:
Figure 11:
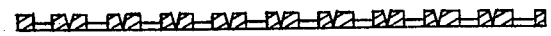

FIGS. 11–13 disclose a nail-carrying structure similar to that shown in FIGS. 5–7 excepting that the nails are so-called T-nails rather than the ordinary flanged-head nails.

It is also to be understood that the following claims are intended to cover all of the generic and specific features of the invention herein described and all statements of the scope of the invention which might be said to fall therebetween.

I claim:

1. An article of manufacture comprising a shaped strip having the general exterior outline of a number of circular nail flanges connected in series, apertures in said strip adapted to hold nails snugly therein, a mechanically weakened linkage at the point of connection between each pair of adjacent flanges, and a T-nail in each aperture, each flange having a diametrically-extending recess on one side to receive the head of a T-nail so that said head can be disposed flush with said flange.

2. An article of manufacture as defined in claim 1 wherein said strip is made of metal.

3. An article of manufacture comprising a shaped strip having the form of a row of circular nail flanges with (1) each pair of successive flanges having a point of mutual tangency, (2) a mechanically weak linkage connecting each flange to an adjacent flange at their point of mutual tangency, and (3) an aperture in each flange, and a nail disposed in each aperture with the opposite ends of said nails being spaced from said flanges, each nail having a head at one end with the maximum cross-sectional dimension of said head being smaller than the diameter of the flange with it is associated, said heads being spaced from one another.

4. An article of manufacture as defined in claim 3 wherein said strip is made of metal.

5. An article of manufacture according to claim 3 wherein each of said flanges has a recess concentric with its aperture which is sized to accomodate the head of the nail associated with said flange.

6. An article of manufacture according to claim 6 wherein each said head has a sloping outer surface and each of said recesses is tapered according to the slope of the said outer surfaces of said nail heads.

* * * * *

UNITED STATES PATENT OFFICE
CERTIFICATE OF CORRECTION

PATENT NO. : 3,954,176
DATED : May 4, 1976
INVENTOR(S) : Harry M. Haytayan

It is certified that error appears in the above-identified patent and that said Letters Patent are hereby corrected as shown below:

Claim 3, column 8, line 13, the word "which" should be added after the word "with".

Claim 6, column 8, line 21, claim "6" should be claim "5".

Signed and Sealed this

Thirteenth Day of July 1976

[SEAL]

Attest:

RUTH C. MASON
Attesting Officer

C. MARSHALL DANN
Commissioner of Patents and Trademarks